US012792810B2

(12) United States Patent
Lin

(10) Patent No.: US 12,792,810 B2
(45) Date of Patent: Nov. 10, 2026

(54) INTEGRATED CIRCUIT AND LAYOUT METHOD THEREOF

(71) Applicant: Realtek Semiconductor Corporation, Hsinchu (TW)

(72) Inventor: Tien-Kuo Lin, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 729 days.

(21) Appl. No.: 18/346,261

(22) Filed: Jul. 2, 2023

(65) Prior Publication Data

US 2024/0012974 A1 Jan. 11, 2024

(30) Foreign Application Priority Data

Jul. 7, 2022 (TW) .................................. 111125516

(51) Int. Cl.

| | |
|---|---|
| ***G06F 30/367*** | (2020.01) |
| ***G06F 30/392*** | (2020.01) |
| ***H03K 17/14*** | (2006.01) |
| ***H03K 17/693*** | (2006.01) |
| *G06F 117/12* | (2020.01) |
| *G06F 119/06* | (2020.01) |

(52) U.S. Cl.
CPC .......... *G06F 30/367* (2020.01); *G06F 30/392* (2020.01); *H03K 17/145* (2013.01); *H03K 17/693* (2013.01); *G06F 2117/12* (2020.01); *G06F 2119/06* (2020.01); *H03K 2217/0036* (2013.01)

(58) Field of Classification Search
USPC .......................................................... 716/133
See application file for complete search history.

(56) References Cited

U.S. PATENT DOCUMENTS

2019/0190510 A1* 6/2019 Smith .................... H02H 3/105

* cited by examiner

*Primary Examiner* — Bryce M Aisaka
(74) *Attorney, Agent, or Firm* — CKC & Partners Co., LLC

(57) ABSTRACT

An integrated circuit includes a functional circuit and a first power switch chain. The first power switch chain includes a first power switch circuit and a second power switch circuit and is coupled between a power source and the functional circuit. The first power switch chain is configured to receive a first control signal, and the first control signal is configured to turn on or turn off the first power switch circuit and the second power switch circuit. A first resistance value of the first power switch circuit is different from a second resistance value of the second power switch circuit.

20 Claims, 11 Drawing Sheets

500

INTEGRATED CIRCUIT AND LAYOUT METHOD THEREOF

RELATED APPLICATIONS

This application claims priority to Taiwanese Application Serial Number 111125516, filed Jul. 7, 2022, which is herein incorporated by reference.

BACKGROUND

Technical Field

The present disclosure relates to technology related to power switch chain technology. More particularly, the present disclosure relates to an integrated circuit including a power switch chain with a non-uniform architecture and a layout method thereof.

Description of Related Art

With development of technology and manufacturing process, leakage current power consumption has a significant influence on overall power consumption of the circuit. For reducing the leakage current power consumption, it can stop providing power to the circuits with higher leakage current power consumption during its idle period.

SUMMARY

Some aspects of the present disclosure are to provide an integrated circuit. The integrated circuit includes a functional circuit and a first power switch chain. The first power switch chain includes a first power switch circuit and a second power switch circuit and is coupled between a power source and the functional circuit. The first power switch chain is configured to receive a first control signal, and the first control signal is configured to turn on or turn off the first power switch circuit and the second power switch circuit. A first resistance value of the first power switch circuit is different from a second resistance value of the second power switch circuit.

Some aspects of the present disclosure are to provide a layout method of an integrated circuit. The layout method includes following operations: determining, by a processor, a position of a first power switch circuit in a first power switch chain and a position of a second power switch circuit in the first power switch chain; generating, by the processor, layout information of a functional circuit, in which the first power switch circuit and the second power switch circuit are coupled between a power source and the functional circuit; generating, by the processor, a simulation result according to the layout information of the functional circuit; and determining, by the processor, a first resistance value of the first power switch circuit and a second resistance value of the second power switch circuit according to the simulation result, in which the first resistance value is different from the second resistance value.

As described above, in the present disclosure, the power switch chain includes at least two types of the power switches with different resistance values to from a non-uniform architecture. Thus, both of the circuit performance and the circuit area are better.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
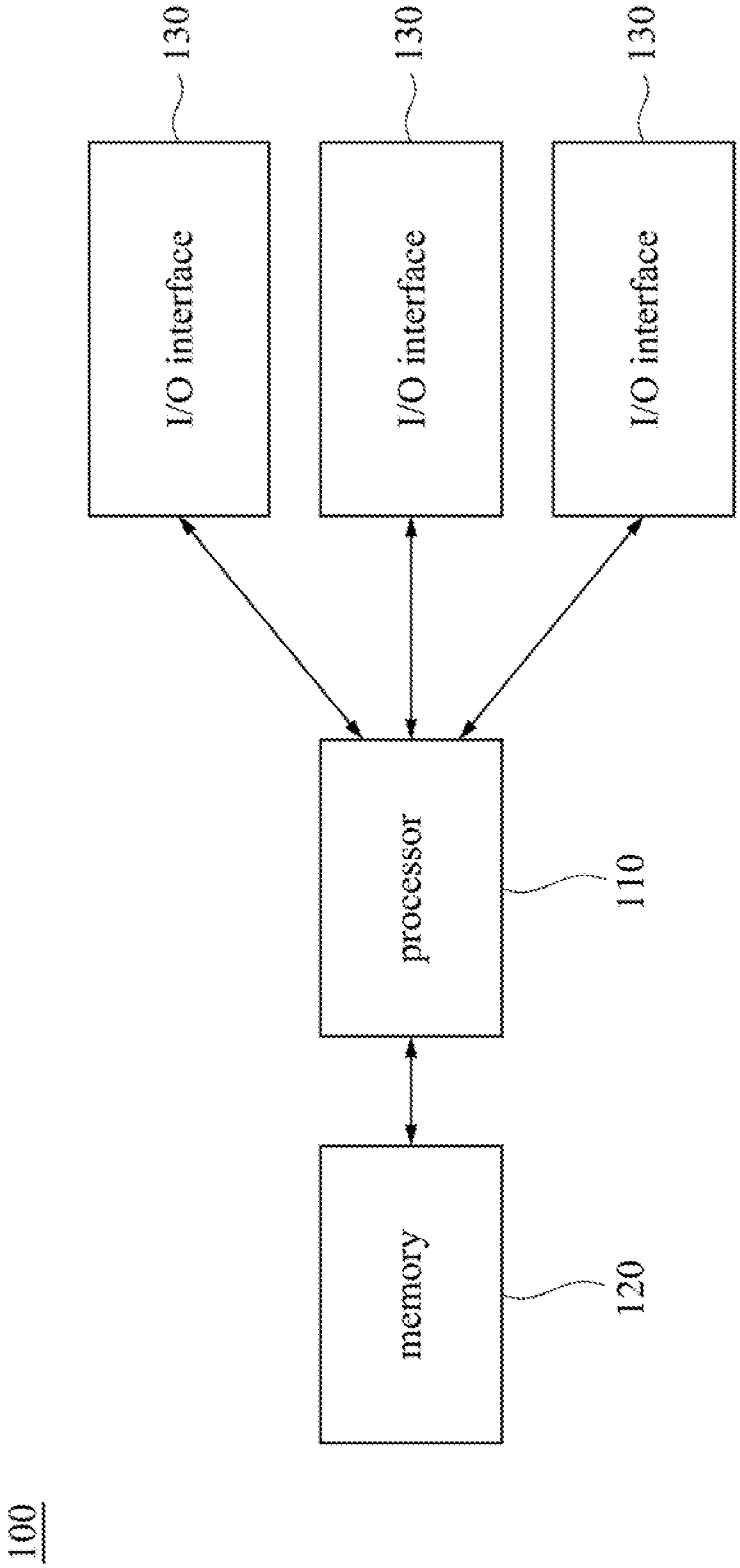
FIG. 1 is a schematic diagram of a design system according to some embodiments of the present disclosure.

Reference is made to FIG. 1. FIG. 1 is a schematic diagram of a design system 100 according to some embodiments of the present disclosure.

As illustrated in FIG. 1, the design system 100 includes a processor 110, a memory 120, and input/output (I/O) interfaces 130. The processor 110 is coupled to the memory 120 and the I/O interfaces 130.

In some embodiments, the processor 110 can be a central processing unit (CPU), an application specific integrated circuit (ASIC), or other circuits with similar functions.

In some embodiments, the memory 120 can be implemented by a non-transitory computer readable storage medium. The non-transitory computer readable storage medium is, for example, a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains. The memory 120 can store a computer program to perform a layout process of an integrated circuit or to verify or simulate layout information of the integrated circuit.

In some embodiments, the I/O interface 130 can be a display panel, a keyboard, a mouse, a touch panel, or other devices with similar functions. The I/O interface 130 is used to receive various inputs or commands.

During the process of designing integrated circuits, a user can operate the I/O interface 130. Then, the processor 110 can receive corresponding instructions and perform the computer program stored in the memory 120 according to the instructions so as to perform some corresponding operations (e.g., a layout method 300 in FIG. 3).

Figure 2:
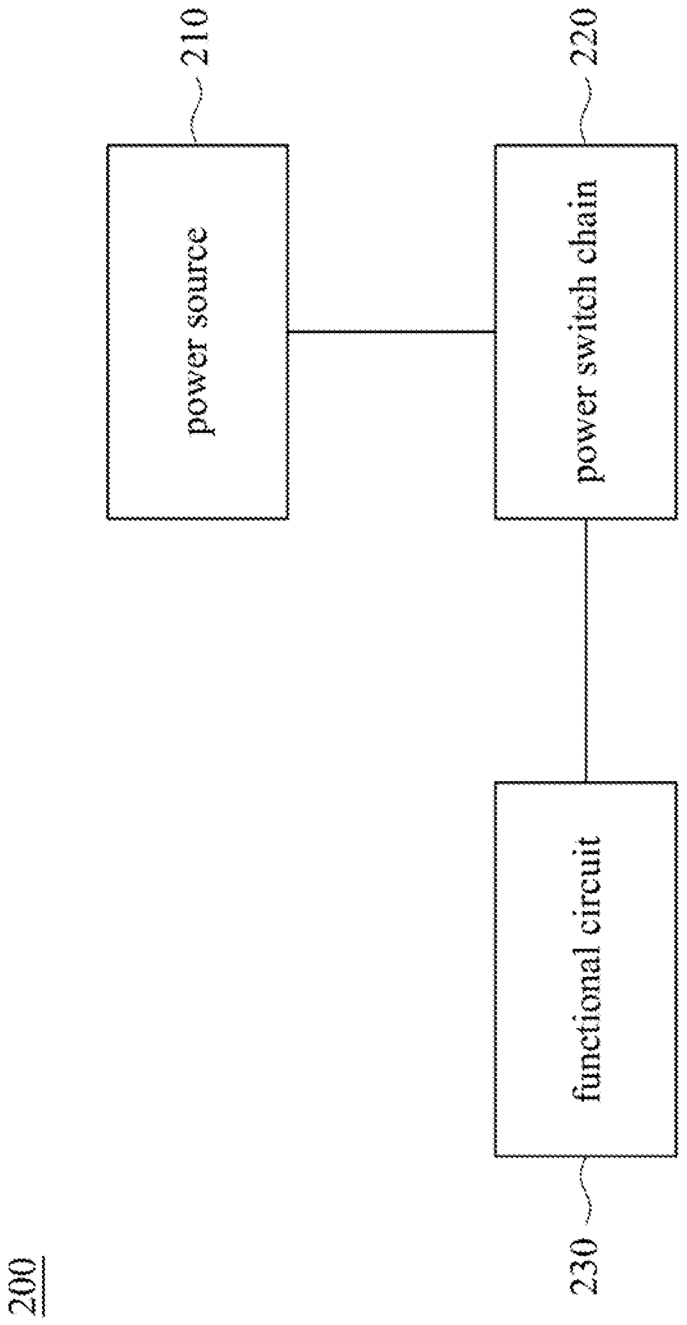
FIG. 2 is a functional block diagram of an integrated circuit according to some embodiments of the present disclosure.

Reference is made to FIG. 2. FIG. 2 is a functional block diagram of an integrated circuit 200 according to some embodiments of the present disclosure.

As illustrated in FIG. 2, the integrated circuit 200 includes a power source 210, a power switch chain 220, and a functional circuit 230. In general, the power source 210 can be coupled to the power switch chain 220 through a power mesh. The power switch chain 220 can be coupled to the functional circuit 230 through metal rails. In other words, the power switch chain 220 is coupled between the power source 210 and the functional circuit 230. In some embodiments, the power switch chain 220, the functional circuit 230, and the metal rails can be disposed in a first metal layer, and the power mesh can be disposed in a second metal layer above the first metal layer.

The power switch chain 220 can receive a control signal (e.g., a control signal CS in FIG. 8) from a control circuit (not shown), and this control signal can be used to turn on or turn off a plurality of power switch circuits (e.g., power switch circuits PS1-PS3 in FIG. 8) in the power switch chain 220 to provide or to stop providing power from the power source 210 to sub-circuits in the functional circuit 230. To be more specific, when a power switch circuit in the power switch chain 220 is turned on, power from the power source 210 can be transmitted to one corresponding sub-circuit in the functional circuit 230 through the power mash, the power switch circuit and the metal rails sequentially. When the one power switch circuit in the power switch chain 220 is turned off, power from the power source 210 cannot be provided to the corresponding sub-circuit in the functional circuit 230. In some embodiments, the power switch circuit can be turned off to stop providing power from the power source 210 to the corresponding sub-circuit during an idle period of the corresponding sub-circuit. Accordingly, the leakage current power consumption of the corresponding sub-circuit can be reduced.

Figure 3:
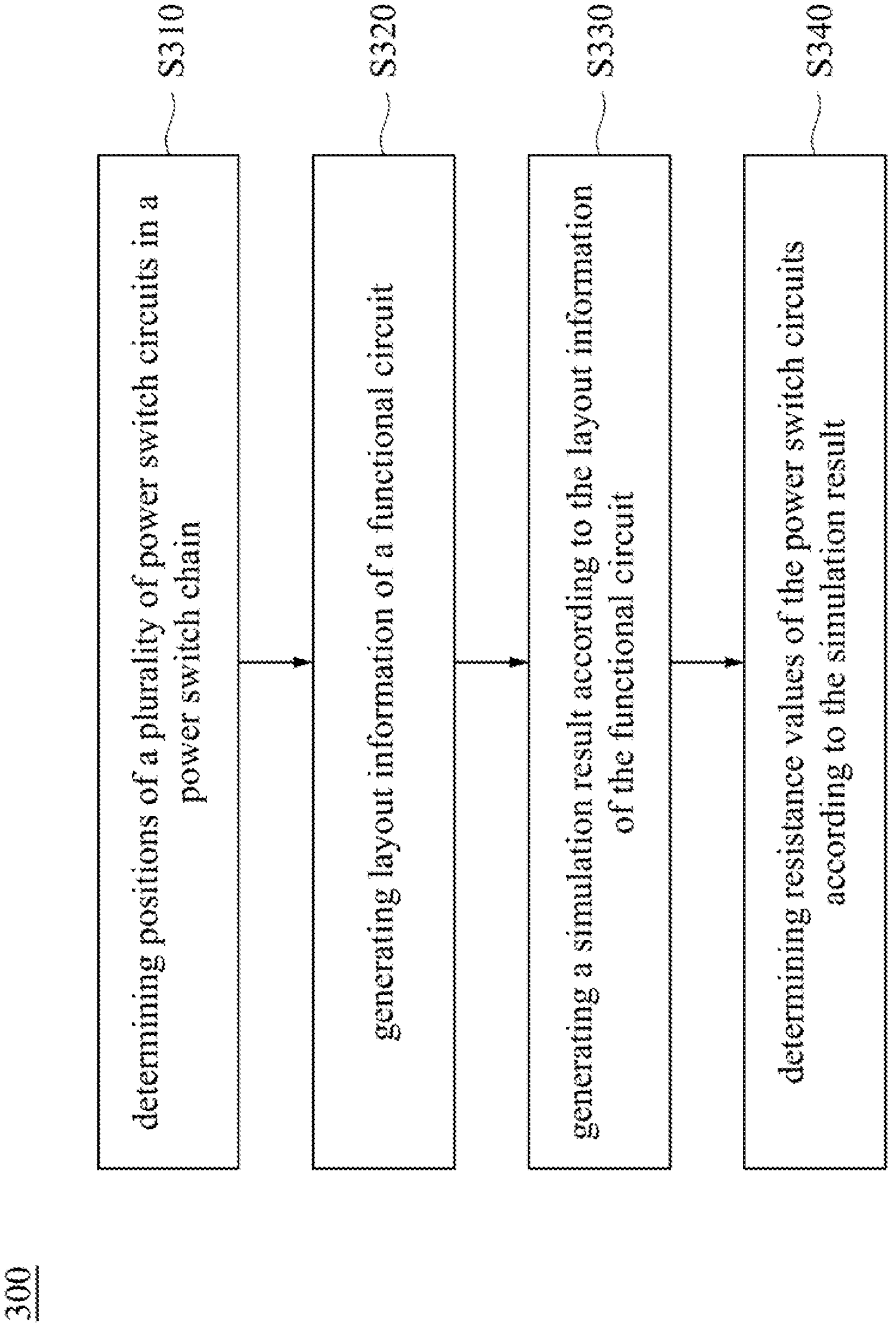
FIG. 3 is a flow diagram of a layout method according to some embodiments of the present disclosure.

Reference is made to FIG. 3. FIG. 3 is a flow diagram of the layout method 300 according to some embodiments of the present disclosure. As illustrated in FIG. 3, the layout method 300 includes operation S310, operation S320, operation S330, and operation S340.

Figure 4:
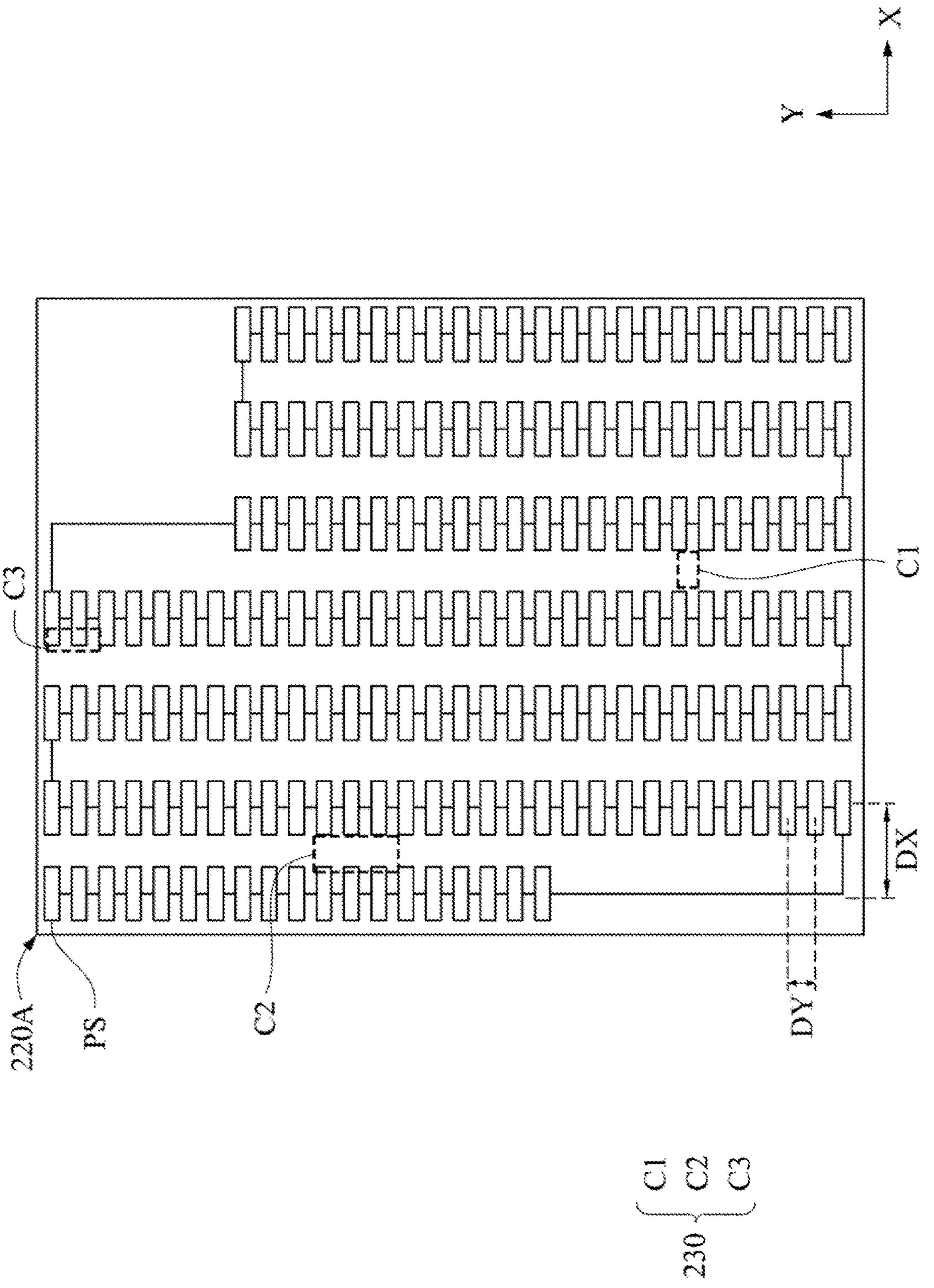
FIG. 4 is a schematic diagram of a preset power switch chain and a functional circuit according to some embodiments of the present disclosure.
Figure 5:
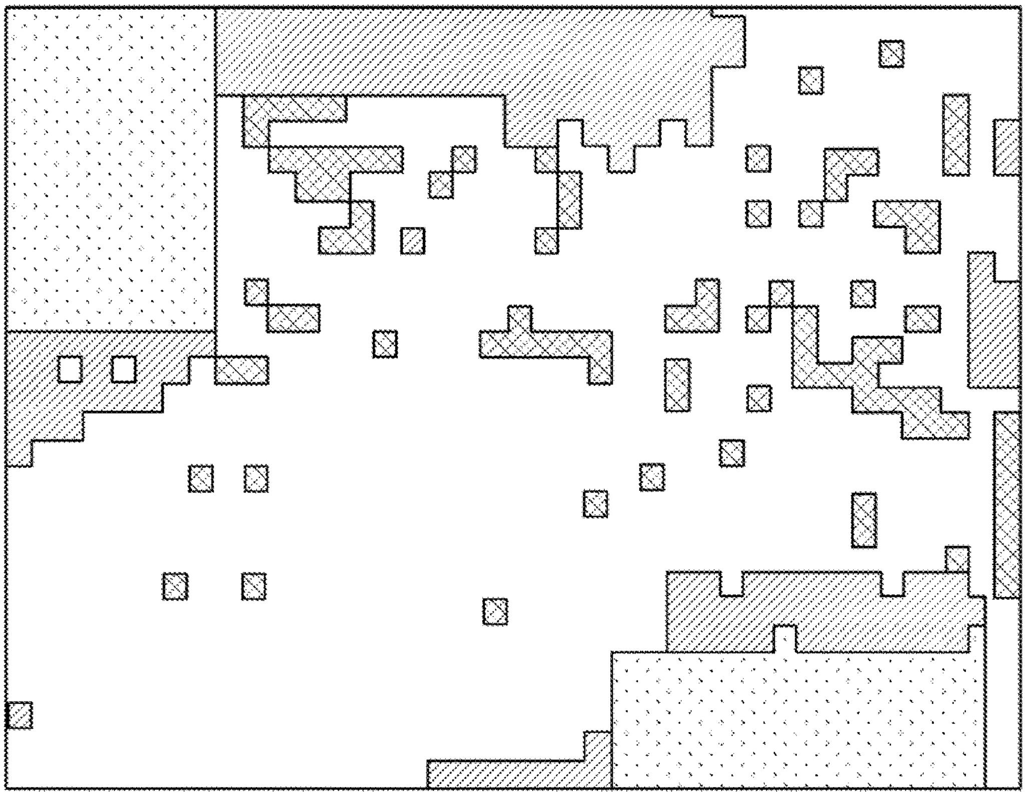
FIG. 5 is a schematic diagram of a simulation result according to some embodiments of the present disclosure.
Figure 6A:
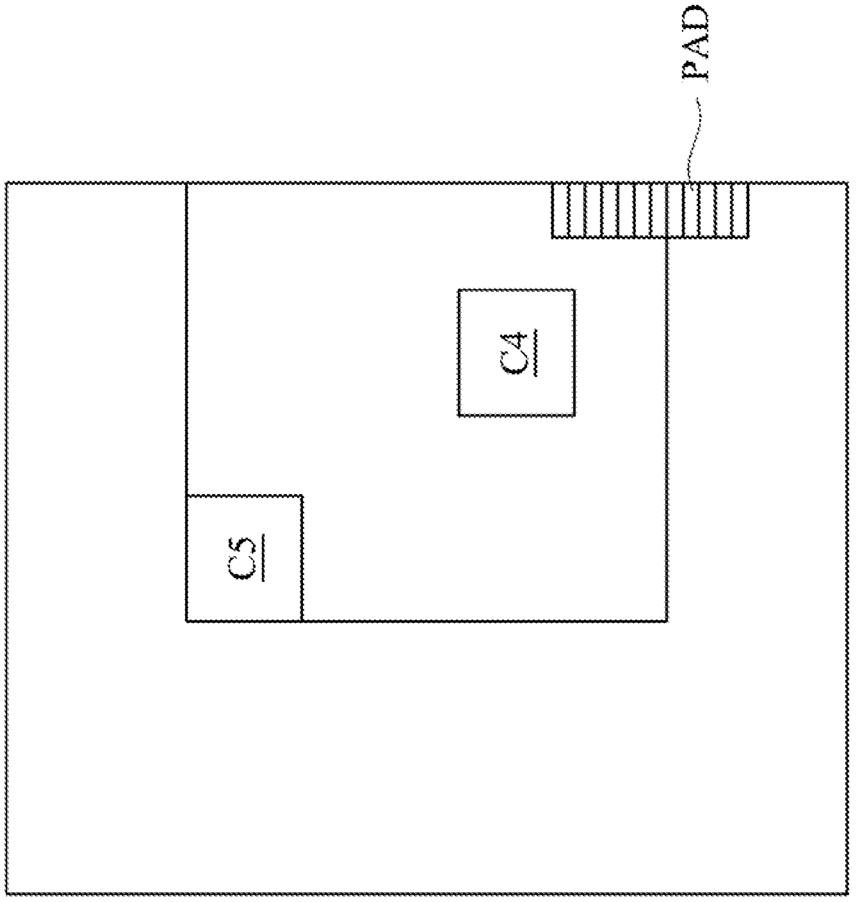
FIG. 6A is a schematic diagram of sub-circuits according to some embodiments of the present disclosure.
Figure 6B:
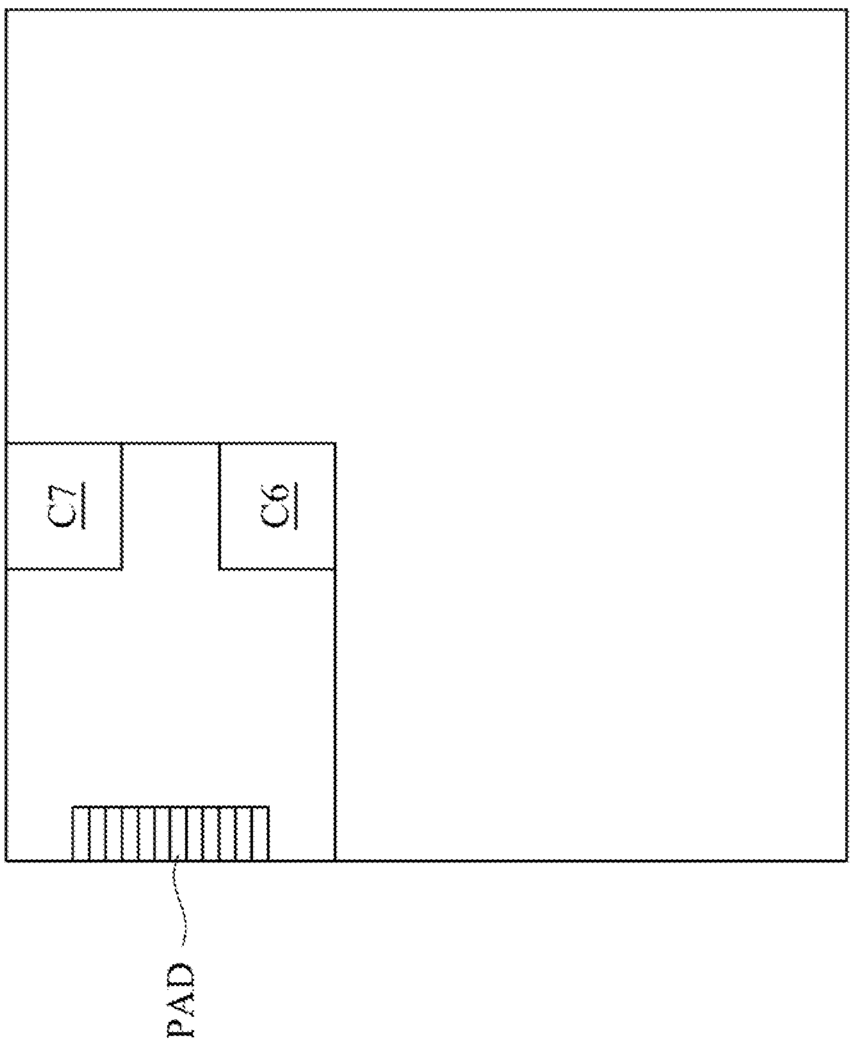
FIG. 6B is a schematic diagram of sub-circuits according to some embodiments of the present disclosure.
Figure 6C:
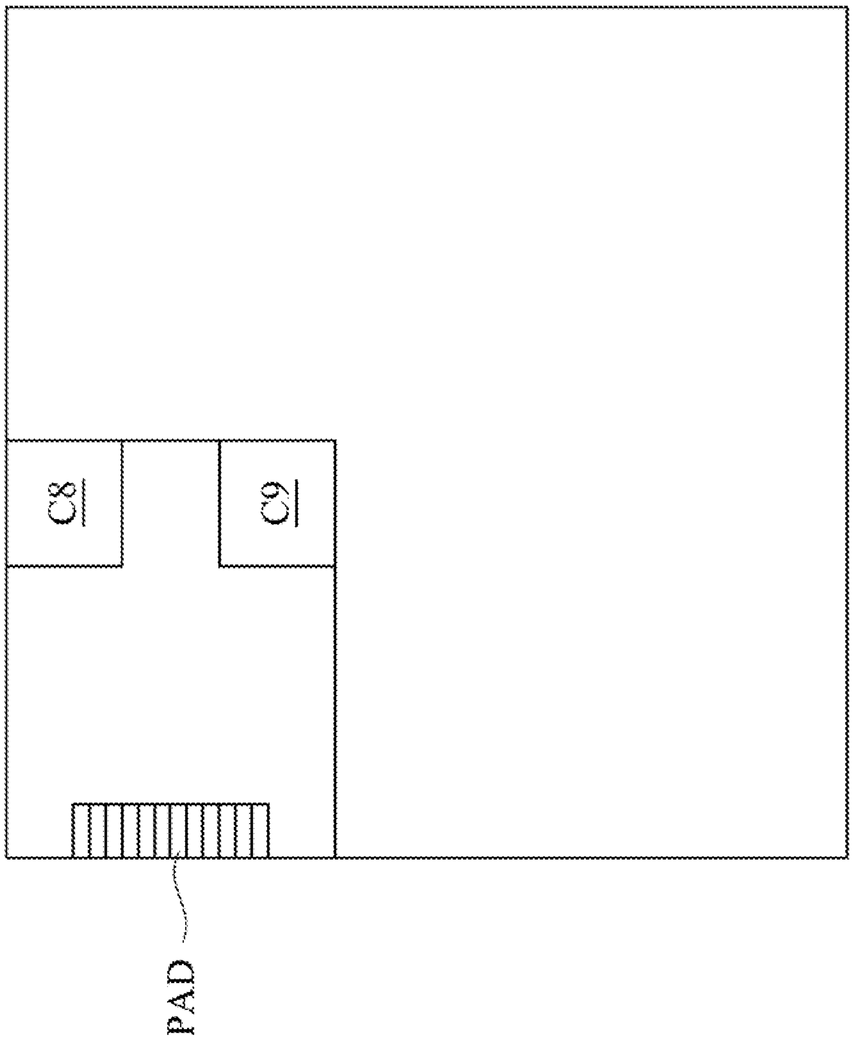
FIG. 6C is a schematic diagram of sub-circuits according to some embodiments of the present disclosure.
Figure 7:
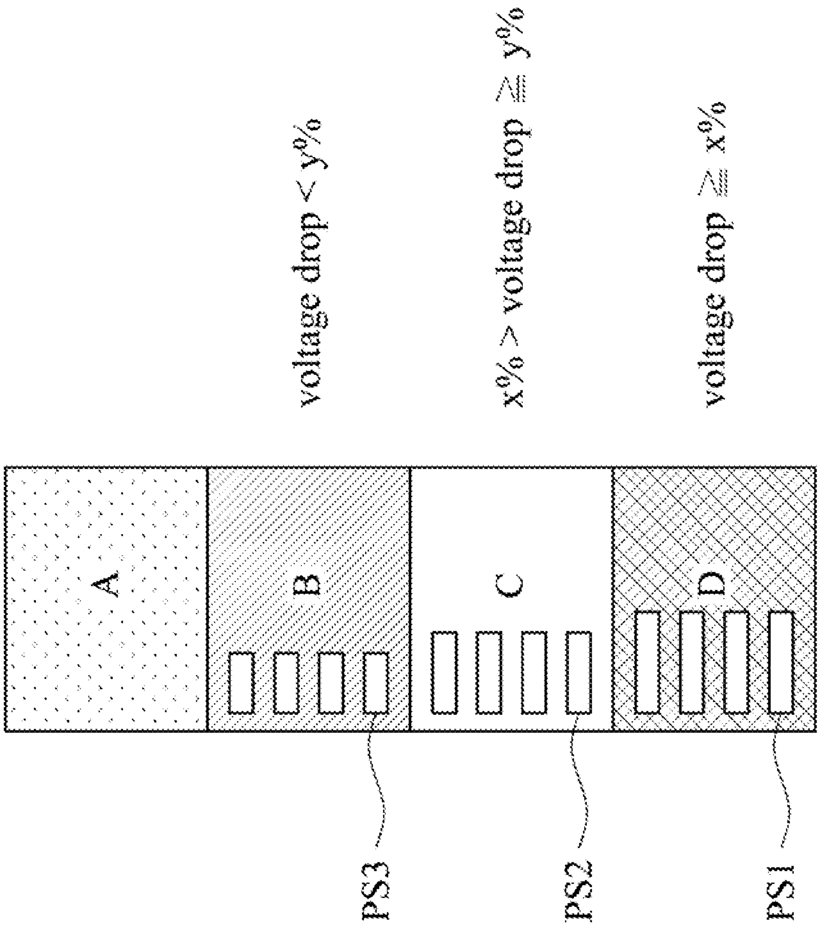
FIG. 7 is a schematic diagram of regions in the simulation result in FIG. 5 according to some embodiments of the present disclosure.
Figure 8:
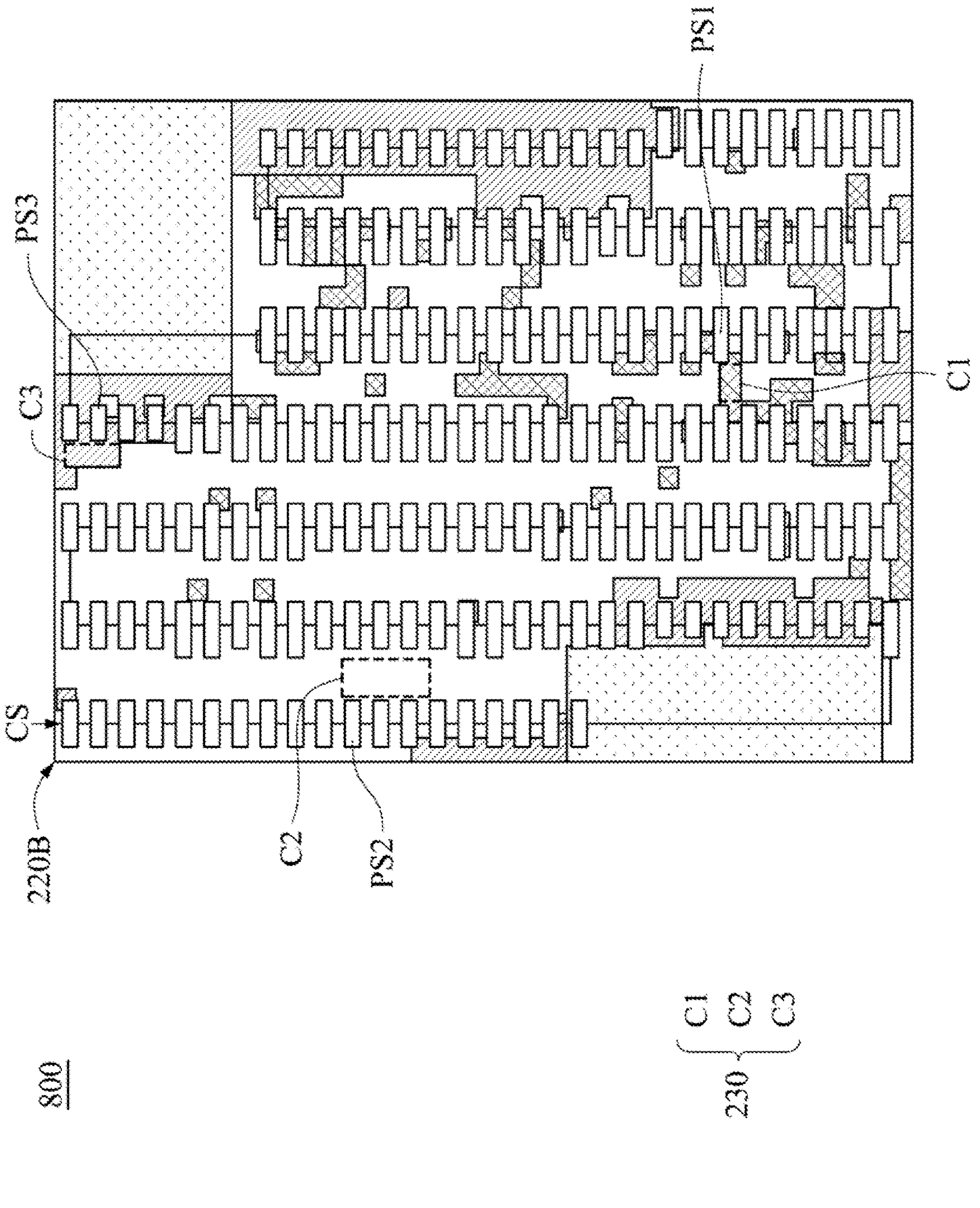
FIG. 8 is a schematic block diagram of an integrated circuit according to some embodiments of the present disclosure.

The layout method 300 is described in following paragraphs with reference to FIG. 4 to FIG. 8. FIG. 4 is a schematic diagram of a preset power switch chain 220A and a functional circuit 230 according to some embodiments of the present disclosure. FIG. 5 is a schematic diagram of a simulation result 500 according to some embodiments of the present disclosure. FIG. 6A, FIG. 6B, and FIG. 6C are schematic diagrams of sub-circuits C4-C9 according to some embodiments of the present disclosure. FIG. 7 is a schematic diagram of regions in the simulation result 500 in FIG. 5 according to some embodiments of the present disclosure. FIG. 8 is a schematic block diagram of an integrated circuit 800 according to some embodiments of the present disclosure.

In operation S310, the processor 110 determines positions of a plurality of power switch circuits PS in the preset power switch chain 220A. As illustrated in FIG. 4, the preset power switch chain 220A includes the power switch circuits PS. The power switch circuits PS are coupled sequentially to form a chain. Each of the power switch circuits PS can include one or more switches. In some embodiments, switches in the power switch circuits PS can be implemented by at least one multi-threshold complementary metal-oxide-semiconductor (MTCMOS). Based on center points of the power switch circuits PS, the processor 110 can predetermine a spacing distance (e.g., a spacing distance DX) directing to a direction X of the power switch circuits PS and a spacing distance (e.g., a spacing distance DY) directing to a direction Y perpendicular to the direction X of the power switch circuits PS so as to determine the positions of the power switch circuits PS.

In operation S320, the processor 110 generates layout information of the functional circuit 230. As described above, the processor 110 can predetermine the positions of the power switch circuits PS in the preset power switch chain 220A. In addition, the processor 110 can predetermine types of the power switch circuits PS. For example, the processor 110 can predetermine the power switch circuits PS to be one type with the smallest resistance value but the largest area (e.g., the power switch circuit PS1 in FIG. 7). The resistance value of one power switch circuit PS refers to an overall equivalent resistance value of the power switch circuit PS. The area of one power switch circuit PS refers a layout range of the power switch circuit PS. Then, the processor 110 can determine an overall area occupied by all of the power switch circuits PS according to the positions and the predetermined areas of the power switch circuits PS. Then, the processor 110 can dispose the functional circuit 230 at regions which are not occupied by the power switch circuits PS to generate the layout information of the functional circuit 230.

In general, the functional circuit 230 includes one or more sub-circuits. Some sub-circuits are standard-cell circuits, and some sub-circuits are non-standard-cell circuits. The standard-cell circuits are, for example, a flip-flop, a combination logic, a buffer, or an inverter. The non-standard-cell circuits are, for example, a static random access memory (SRAM), an analog block, or a digital block.

For better understanding, the functional circuit 230 in FIG. 4 merely illustrates sub-circuits C1-C3, and other sub-circuits in the functional circuit 230 are omitted. The sub-circuits C1-C3 in FIG. 4 (sub-circuit C4-C9 in FIG. 6A to FIG. 6C) can be standard-cell circuits.

In operation S330, the processor 110 generates the simulation result 500 according to the layout information of the functional circuit 230. For example, the processor 110 can perform the computer program stored in the memory 120 to perform a voltage drop (or IR drop) simulation on the layout information generated in operation S320 to generate the simulation result 500. In other words, the simulation result 500 is voltage drop information, and the simulation result 500 can reflect the voltage drop of each sub-circuit in the functional circuit 230.

As illustrated in FIG. 6A, a distance between the sub-circuit C5 and a power pad PAD is greater than a distance between the sub-circuit C4 and the power pad PAD. It is assumed that other conditions (e.g., element density, computation amount) of the sub-circuit C4 and the sub-circuit C5 are identical or approximately identical. Since the distance between the sub-circuit C5 and the power pad PAD is greater than the distance between the sub-circuit C4 and the power pad PAD, a voltage drop of the sub-circuit C5 is greater than a voltage drop of the sub-circuit C4.

In addition, as illustrated in FIG. 6B, it is assumed that a density of units in the sub-circuit C6 is 90%, a density of units in the sub-circuit C7 is 40%, and other conditions (e.g., distance from the power pad PAD, computation amount) of the sub-circuit C6 and the sub-circuit C7 are identical (or substantially identical). Since the density of units in the sub-circuit C6 is greater than the density of units in the sub-circuit C7, a voltage drop of the sub-circuit C6 is greater than a voltage drop of the sub-circuit C7.

In addition, as illustrated in FIG. 6C, it is assumed that the sub-circuit C8 is relatively busy, the sub-circuit C9 has a longer idle period, and other conditions (e.g., distance from the power pad PAD, element density) of the sub-circuit C8 and the sub-circuit C9 are identical (or substantially identical). Since the sub-circuit C8 done more computational tasks than the sub-circuit C9, a voltage drop of the sub-circuit C8 is greater than a voltage drop of the sub-circuit C9.

In the embodiments above, the power pad PAD can be coupled to a power source or a ground terminal to receive a power voltage or a ground voltage. It is noted that although only one factor affects the voltage drops of the sub-circuits in the above paragraphs, the voltage drops of the sub-circuits can be affected by a combination of multiple factors in practical applications.

In operation S340, the processor 110 determines types of the power switch circuits PS (e.g., determines resistance values and areas of the power switch circuits PS) according to the simulation result 500. As illustrated in FIG. 5 and FIG. 7, the simulation result 500 includes a circuit region A, a circuit region B, a circuit region C, and a circuit region D. The circuit region A is a region without standard-cell circuits. The circuit region B is a region with standard-cell circuits and its voltage drop is less than y %. The circuit region C is a region with standard-cell circuits and its voltage drop is greater than or equal to y % and less than x %. The circuit region D is a region with standard-cell circuits and its voltage drop is greater than or equal to x %.

Since the circuit region A has no standard-cell circuits, there is no power switch circuit PS is the circuit region A.

In addition, since the voltage drop of the circuit region D is greater than the voltage drop of the circuit region C, the processor 110 disposes the power switch circuits PS1 at positions corresponding to the circuit region D, and disposes the power switch circuits PS2 at positions corresponding to the circuit region C. A resistance value of the power switch circuit PS1 is less than a resistance value of the power switch circuit PS2, but an area of the power switch circuit PS1 is greater than an area of the power switch circuit PS2.

Similarly, since the voltage drop of the circuit region C is greater than the voltage drop of the circuit region B, the processor 110 disposes the power switch circuits PS2 at positions corresponding to the circuit region C, and disposes the power switch circuits PS3 at positions corresponding to the circuit region B. The resistance value of the power switch circuit PS2 is less than a resistance value of the power switch circuit PS3, but the area of the power switch circuit PS2 is greater than an area of the power switch circuit PS3.

In other words, the resistance values of the power switch circuit PS1, the power switch circuit PS2, and the power switch circuit PS3 are different from each other. The areas of the power switch circuit PS1, the power switch circuit PS2, and the power switch circuit PS3 are also different from each other.

Based on the principles above, the processor 110 can determine the types of the power switch circuits PS according to the simulation result 500 in FIG. 5. As illustrated in FIG. 8, in the power switch chain 220B, the power switch circuits PS1 are disposed at positions corresponding to the sub-circuit C1 (positions adjacent to the sub-circuit C1), the power switch circuits PS2 are disposed at positions corresponding to the sub-circuit C2 (positions adjacent to the sub-circuit C2), and the power switch circuits PS3 are disposed at positions corresponding to the sub-circuit C3 (positions adjacent to the sub-circuit C3).

In some embodiments, after the positions and the types (the resistance values and the areas) of the power switch circuits PS are decided, the processor 110 can perform a design rule check (DRC) verification, a layout versus schematic (LVS) verification, or other various verifications on the layout information of the integrated circuit 800 (including the power switch chain 220B and the functional circuit 230). After the verifications are passed, the integrated circuit 800 can be manufactured based on the layout information of the integrated circuit 800 by using a semiconductor process.

In some related approaches, a power switch chain has a uniform architecture. In other words, all power switch circuits in the power switch chain are identical (all power switch circuits have the same resistance value and the same area). However, when all power switch circuits are identical, the type with a relatively smaller resistance value but a relatively larger area (e.g., the power switch circuit PS1) is chosen such that the overall voltage drop of the maximum voltage drop region can meet the design requirements. Since all power switch circuits have the relatively smaller resistance value and the relatively larger area, this power switch chain occupies a relatively larger circuit area.

Compared to the aforementioned related approaches, in the present disclosure, the power switch chain 220B includes the different power switch circuits PS1-PS3, and these power switch circuits PS1-PS3 (with different resistance values and different areas) are appropriately disposed at corresponding positions according to the simulation result 500 (e.g., voltage drop information). Thus, not only overall voltage drop of each circuit region can meet the design requirement but also the circuit area can be reduced.

It is noted that FIG. 8 takes three types of the power switch circuits PS1-PS3 as examples but the present disclosure is not limited thereto.

Figure 9:
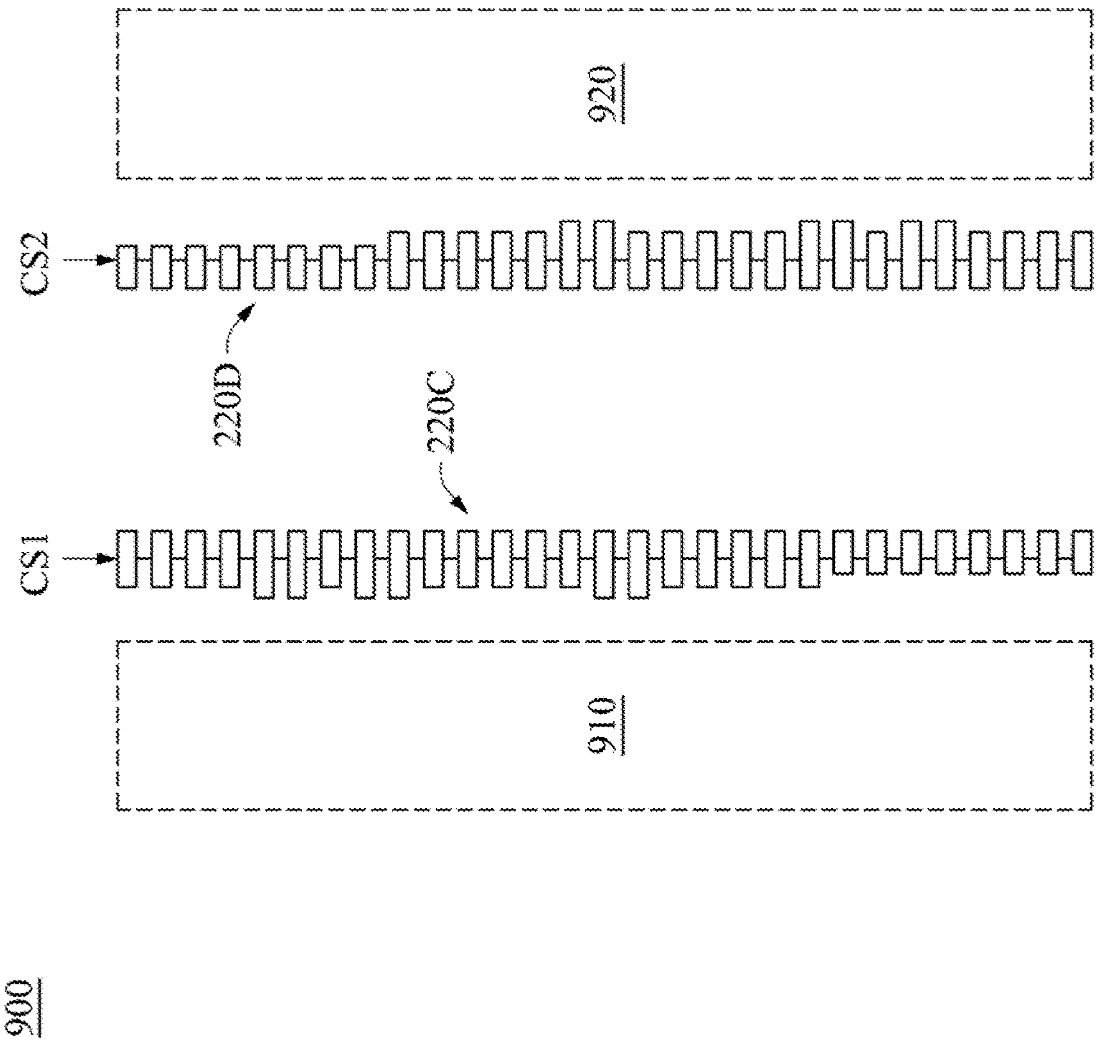
FIG. 9 is a schematic block diagram of an integrated circuit according to some embodiments of the present disclosure.

Reference is made to FIG. 9. FIG. 9 is a schematic block diagram of an integrated circuit 900 according to some embodiments of the present disclosure.

The integrated circuit 900 in FIG. 9 can be, for example, a multi-core system. In other words, the integrated circuit 900 includes a core circuit 910 and a core circuit 920. The integrated circuit 900 can further include a power switch chain 220C and a power switch chain 220D. The power switch chain 220C is disposed at a position corresponding to the core circuit 910 (adjacent to the core circuit 910), the power switch chain 220D is disposed at a position corresponding to the core circuit 920 (adjacent to the core circuit 920), and the power switch chain 220C and the power switch chain 220D are controlled independently. In other words, the power switch chain 220C and the power switch chain 220D can be controlled by different control signals respectively. As illustrated in FIG. 9, a control signal CS1 is used to turn on or turn off a plurality of power switch circuits in the power switch chain 220C, and a control signal CS2 is used to turn on or turn off a plurality of power switch circuits in the power switch chain 220D. The control signal CS1 or the control signal CS2 can be from one or more control circuits (not shown). When the core circuit 910 does not operate (during an idle period of the core circuit 910), the control signal CS1 can turn off the power switch circuits in the power switch chain 220C to stop providing power to the core circuit 910. When the core circuit 910 operates (during an operation period of the core circuit 910), the control signal CS1 can turn on the power switch circuits in the power switch chain 220C to provide power to the core circuit 910. Similarly, when the core circuit 920 does not operate (during an idle period of the core circuit 920), the control signal CS2 can turn off the power switch circuits in the power switch chain 220D to stop providing power to the core circuit 920. When the core circuit 920 operates (during an operation period of the core circuit 920), the control signal CS2 can turn on the power switch circuits in the power switch chain 220D to provide power to the core circuit 920.

The configurations of the power switch chain 220C and the power switch chain 220D are similar to the power switch chain 220B in FIG. 8. In other words, the power switch chain 220C or the power switch chain 220D includes power switch circuits with different resistance values (different areas), and the power switch circuits are coupled sequentially to form a chain. Other details are described in the paragraphs related to the power switch chain 220B, so they are not described herein again.

As described above, in the present disclosure, the power switch chain includes at least two types of the power switches with different resistance values to from a non-uniform architecture. Thus, both of the circuit performance and the circuit area are better.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An integrated circuit, comprising:

a functional circuit; and a first power switch chain comprising a first power switch circuit and a second power switch circuit and coupled between a power source and the functional circuit, wherein the first power switch chain is configured to receive a first control signal, and the first control signal is configured to turn on or turn off the first power switch circuit and the second power switch circuit, wherein a first resistance value of the first power switch circuit is different from a second resistance value of the second power switch circuit, and a first area of the first power switch circuit is different from a second area of the second power switch circuit.

2. The integrated circuit of claim 1, wherein the functional circuit comprises a first sub-circuit and a second sub-circuit, a position of the first power switch circuit corresponds to the first sub-circuit, a position of the second power switch circuit corresponds to the second sub-circuit, a first voltage drop of the first sub-circuit is greater than a second voltage drop of the second sub-circuit, and the first resistance value is less than the second resistance value.

3. The integrated circuit of claim 2, wherein the first area of the first power switch circuit is greater than the second area of the second power switch circuit.

4. The integrated circuit of claim 2, wherein the functional circuit further comprises a third sub-circuit, the first power switch chain further comprises a third power switch circuit, and a position of the third power switch circuit corresponds to the third sub-circuit, wherein the second voltage drop is greater than a third voltage drop of the third sub-circuit, and the second resistance value is less than a third resistance value of the third power switch circuit.

5. The integrated circuit of claim 4, wherein the second area of the second power switch circuit is greater than a third area of the third power switch circuit.

6. The integrated circuit of claim 2, wherein a first distance between the first sub-circuit and a power pad is greater than a second distance between the second sub-circuit and the power pad.

7. The integrated circuit of claim 2, wherein a first density of units of the first sub-circuit is greater than a second density of units of the second sub-circuit.

8. The integrated circuit of claim 2, wherein the first sub-circuit done more computational tasks than the second sub-circuit.

9. The integrated circuit of claim 1, further comprising:

a second power switch chain comprising a third power switch circuit and a fourth power switch circuit and coupled between the power source and the functional circuit, wherein the second power switch chain is configured to receive a second control signal, and the second control signal is configured to turn on or turn off the third power switch circuit and the fourth power switch circuit, wherein a third resistance value of the third power switch circuit is different from a fourth resistance value of the fourth power switch circuit.

10. The integrated circuit of claim 9, wherein the functional circuit comprises a first core circuit and a second core circuit, a position of the first power switch chain corresponds to the first core circuit, and a position of the second power switch chain corresponds to the second core circuit.

11. The integrated circuit of claim 9, wherein the first power switch circuit or the second power switch circuit comprises a multi-threshold complementary metal-oxide-semiconductor.

12. A layout method of an integrated circuit, comprising:

determining, by a processor, a position of a first power switch circuit in a first power switch chain and a position of a second power switch circuit in the first power switch chain;

generating, by the processor, layout information of a functional circuit, wherein the first power switch circuit and the second power switch circuit are coupled between a power source and the functional circuit;

generating, by the processor, a simulation result according to the layout information of the functional circuit; and determining, by the processor, a first resistance value of the first power switch circuit and a second resistance value of the second power switch circuit according to the simulation result, wherein the first resistance value is different from the second resistance value, and a first area of the first power switch circuit is different from a second area of the second power switch circuit.

13. The layout method of claim 12, wherein the simulation result is voltage drop information.

14. The layout method of claim 12, further comprising:

determining, by the processor, the position of the first power switch circuit and the position of the second power switch circuit according to a first spacing distance directing to a first direction and a second spacing distance directing to a second direction.

15. The layout method of claim 14, wherein the first direction is perpendicular to the second direction.

16. The layout method of claim 12, wherein the functional circuit comprises a first sub-circuit and a second sub-circuit, the position of the first power switch circuit corresponds to the first sub-circuit, the position of the second power switch circuit corresponds to the second sub-circuit, a first voltage drop of the first sub-circuit is greater than a second voltage drop of the second sub-circuit, and the first resistance value is less than the second resistance value.

17. The layout method of claim 16, wherein the first area of the first power switch circuit is greater than the second area of the second power switch circuit.

18. The layout method of claim 16, wherein the functional circuit further comprises a third sub-circuit, the first power switch chain further comprises a third power switch circuit, and a position of the third power switch circuit corresponds to the third sub-circuit, wherein the second voltage drop is greater than a third voltage drop of the third sub-circuit, and the second resistance value is less than a third resistance value of the third power switch circuit.

19. The layout method of claim 18, wherein the second area of the second power switch circuit is greater than a third area of the third power switch circuit.

20. The layout method of claim 12, wherein the first power switch circuit or the second power switch circuit comprises a multi-threshold complementary metal-oxide-semiconductor.

* * * * *